United States Patent [19]

Nagata

[11] Patent Number: 4,920,844

[45] Date of Patent: May 1, 1990

[54] APPARATUS FOR CUTTING BEAN CURD INTO PIECES OF THE FIXED SIZE AND PACKING THEM

[75] Inventor: Zenji Nagata, Yamatotakada, Japan

[73] Assignee: Sanyo Shokuhin Kabushiki Kaisha, Nara, Japan

[21] Appl. No.: 215,416

[22] Filed: Jul. 5, 1988

[30] Foreign Application Priority Data

Jul. 2, 1987 [JP] Japan ................................ 62-166042
Jul. 6, 1987 [JP] Japan ................................ 62-168250

[51] Int. Cl.⁵ ........................... A23L 1/20; B26D 7/00
[52] U.S. Cl. ................................. 83/404.3; 83/425.2; 99/537; 99/536
[58] Field of Search ..................... 83/22, 24, 98, 402, 83/404.3, 425.2; 99/537, 536; 426/518, 634, 656

[56] References Cited

U.S. PATENT DOCUMENTS 2,216,525  10/1940  Van Buren ..................... 83/404.3
3,432,278   3/1969  Comstock et al. ............ 83/404.3 X
4,771,681   9/1988  Nagata ............................. 99/536 X

FOREIGN PATENT DOCUMENTS 1423787   2/1976  United Kingdom ............... 83/404.3

Primary Examiner—Frank Y. Yost
Assistant Examiner—Eugenia A. Jones
Attorney, Agent, or Firm—Wenderoth, Lind & Ponack

[57] ABSTRACT

An apparatus for cutting bean curd into pieces of the fixed size and packing them. This apparatus does automatically: the transporting, cutting and packing of bean curd under water in a water tank. Therefore, this apparatus requires no manual operation, is sanitary, involves high production capacity and is free from production of bean curd of broken shape.

1 Claim, 5 Drawing Sheets

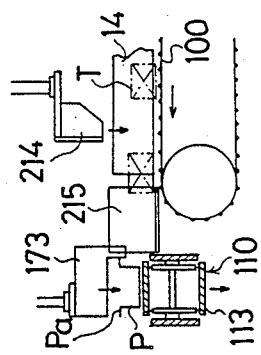
FIG. 6(a)
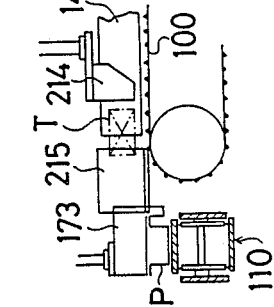
Fig 6(b)
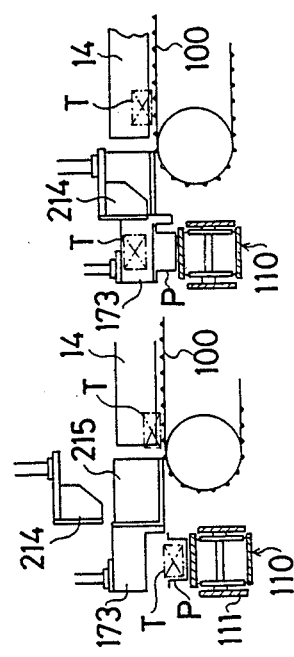
Fig 6(c)
Fig 6(d)
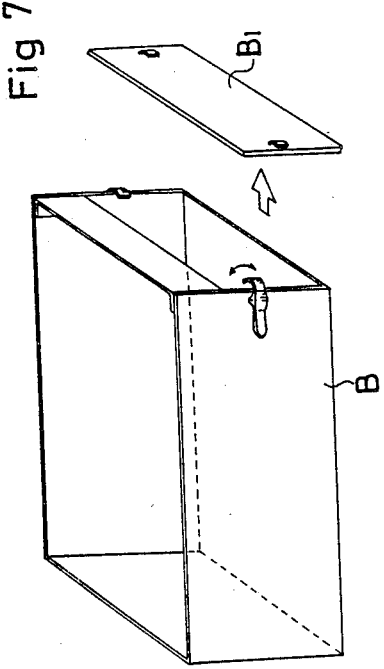
Fig 7

APPARATUS FOR CUTTING BEAN CURD INTO PIECES OF THE FIXED SIZE AND PACKING THEM

BACKGROUND OF THE INVENTION

1. Field of the invention:

This invention relates to an apparatus for cutting bean curd into pieces of the fixed size and packing them automatically.

2. Prior art:

Fine-grained bean curd (called KINUKOSHI TOFU in Japan) is generally manufactured in the following way. Soybeans which have been soaked in water and have grown sodden are crushed and boiled and then soybean milk is obtained by separating bean curd refuse. Soybean milk thus obtained is mixed with a coagulating agent and is coagulated into fine-grained bean curd. Bean curd is classified into "filled bean curd" and "cut bean curd" according to the method of manufacturing the bean curd. In the case of "filled bean curd", soybean milk is cooled, is mixed with a coagulating agent and is poured into a pack of a size and a shape corresponding to one piece of bean curd. Each pack is sealed hermetically and is heated to such an extent that the soybean milk therein coagulates. In manufacturing the filled bean curd in the above way, the air which intermingles with soybean milk when soybean milk is put in a pack and is sealed hermetically releases air bubbles, when heating the soybean milk or with the lapse of time after filling. Such air bubbles float on the surface of soy bean milk in the pack, and if soy bean is coagulated in this state, bubbles are formed at the surface of bean curd. Presence of such bubbles will lower the commodity value of bean curd.

As compared with filled bean curd, in the case of "cut bean curd" soybean milk is coagulated in a coagulating box of the size corresponding to at least several pieces of bean curd and is then cut into several pieces of bean curd of the desired size. In manufacturing the cut bean curd, when soy bean milk is poured into a coagulating box air bubbles mingle with soybean milk but most of them get of of the soybean milk before the soy bean milk coagulates and therefore bubbles are hardly formed at the surface of the bean curd.

Coarse-grained bean curd (called MOMEN TOFU in Japan) is manufactured in the following way, namely, coagulated soybean milk is broken into many small blocks and such broken bean curds blocks are filled in a shaping box for pressing, dehydrating and shaping. The shaping box is emptied into a water tank and bean curd in the water tank is cut manually into pieces of the fixed size or bean curd in the shaping box is cut into pieces of the predetermined size and the shaping box is emptied into the water tank. Bean curd pieces of the desired size in the water tank are dipped up piece by piece by hand and one piece each is put in a container. Since bean curd is soft and easy to break, utmost care is required for cutting and packing.

Since the so-called cut bean curd (cut in the predetermined size after coagulation) is soft and very easy to break, when cut bean curd manufactured in the specified shape is put piece by piece in a pack, such packing cannot be done in the air. It has therefore been a usual practice in packing cut bean curd to soak cut bean curd in the water, dip up carefully piece by piece out of the water by hand and put one piece each in a pack held by the other hand. Packs, each containing one piece of bean curd, are supplied to an automatic packing machine through a conveying means, such as a conveyor, or manually for wrapping up in a thin film, such as polyethylene film, and then shipped. Packing of bean curd is an indispensable operation for a bean curd manufacturer who manufactures bean curd in large quantities for wholesaling to supermarkets and retailers. However, since cut bean curd is soft and very easy to break as mentioned before, it is impossible to wrap up or pack bean curd automatically or mechanically. For this reason, bean curd is dipped up carefully out of the water in which is has been soaked and then is packed. This involves poor efficiency and requires many hands in a manufacturing process including cutting in the fixed size and packing. Moreover, since bean curd is soaked in ambient water or in lukewarm water, sundry germs easily stick to bean curd and there is a fear that such sundry germs propagate after seal-packing.

SUMMARY OF THE INVENTION

The present invention has been made to solve the above problematical points.

The apparatus according to the present invention comprises a lift on which a box containing coagulated bean curd is placed and which box is tiltable and movable up and down, a sending out table which is adjacent to said lift, is slidable horizontally below the surface of the water in a water tank and onto which bean curd is transferred from the box on the lift, a pushing out means for pushing out bean curd on the sending out table toward the direction intersecting the sliding direction of the sending out table, blades which cut been curd of large cylindrical form into plural pieces and which oppose said pushing out means, a receiving table adjacent to said pushing out means, a fixed quantity pushing out means for pushing out further piece by piece a plurality of bean curd pieces cut in cylindrical form on the receiving table and pushed out, a horizontally pushing out means which is driven in synchronism with the fixed quantity pushing out means and which pushes out horizontally bean curd pieces of cylindrical form piece by piece to the side of the fixed quantity pushing out means, an up and down guide which is provided opposite to the fixed quantity pushing out means and which stops bean curd pieces of cylindrical form pushed out by the fixed quantity pushing out means at the fixed position and a pushing out and cutting means which, when the up and down guide descends, pushes out horizontally bean curds of cylindrical form and cut them in the fixed size by blades.

The apparatus further carries out packing of bean curd cut to predetermined size by the cutting device. A packing device comprises a conveyor which is equipped with a pack floating preventive mechanism and which is movable up and down, a pack supplying machine provided above one end of the conveyor which supplies packs onto the conveyor in synchronism with the intermittent driving of the conveyor, a bean curd supplying means for pushing bean curd into a pack in the water when the conveyor descends and a guide device which guides bean curd accurately to each empty pack and which rises and lowers in synchronism with the conveyor.

BRIEF DESCRIPTION OF THE DRAWINGS

The drawings shown an embodiment of the apparatus for cutting bean curd into pieces of predetermined size and packing them, according to the present invention, in which:

FIG. 6 is an explanatory drawing showing the packing process; and

FIG. 7 is an explanatory drawing of a box for coagulating.

DETAILED DESCRIPTION OF THE INVENTION

Figure 1:
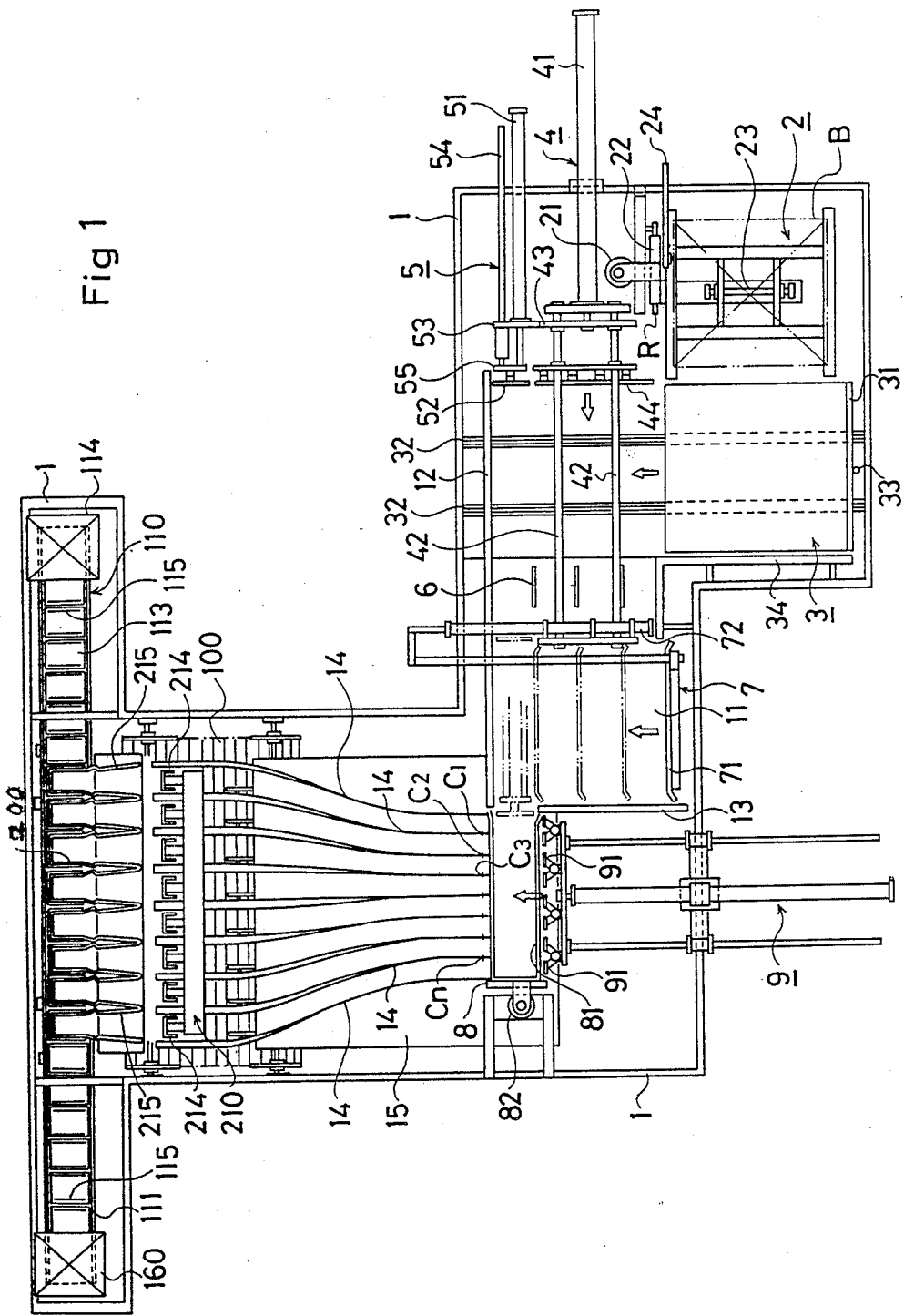
FIG. 1 is a plan view showing the whole of the apparauts.
Figure 2:
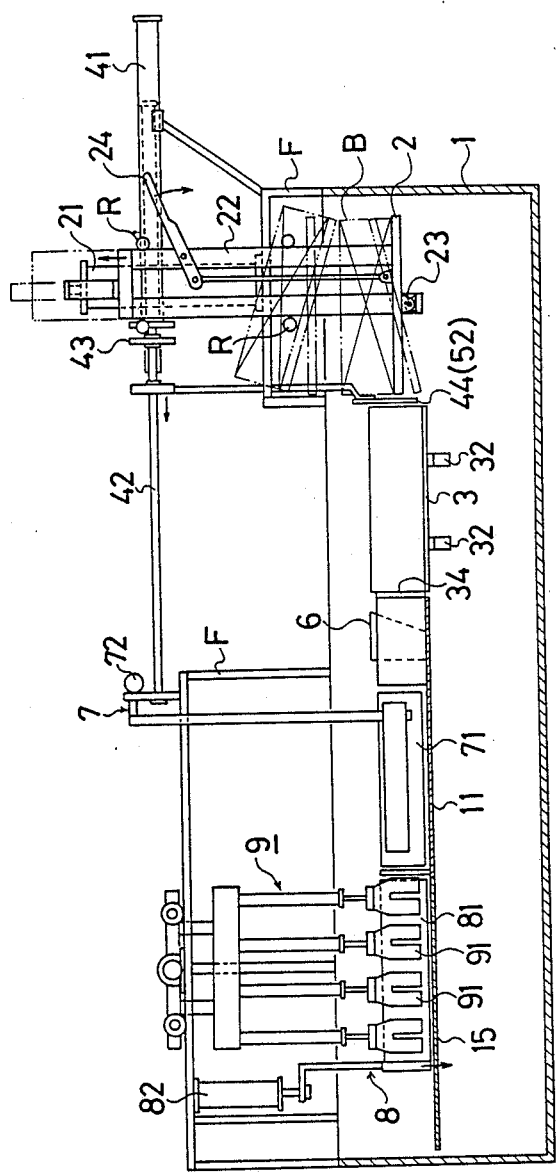
FIG. 2 is a front view, in vertical section, of the apparatus.
Figure 3:
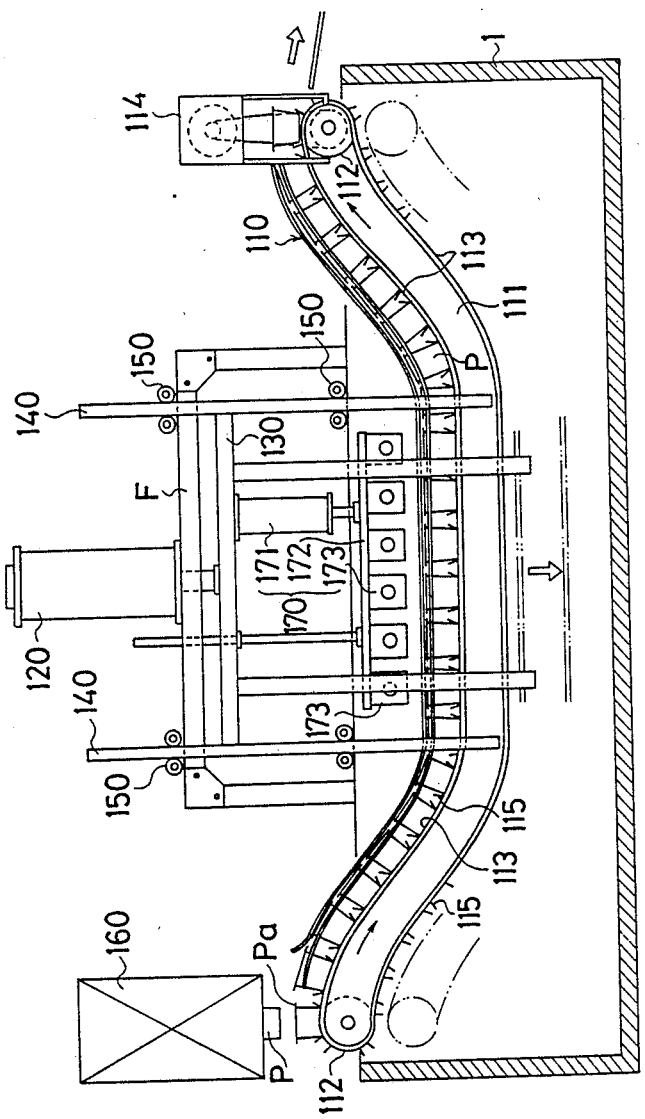
FIG. 3 is a plan view of the packing apparatus.
Figure 5:
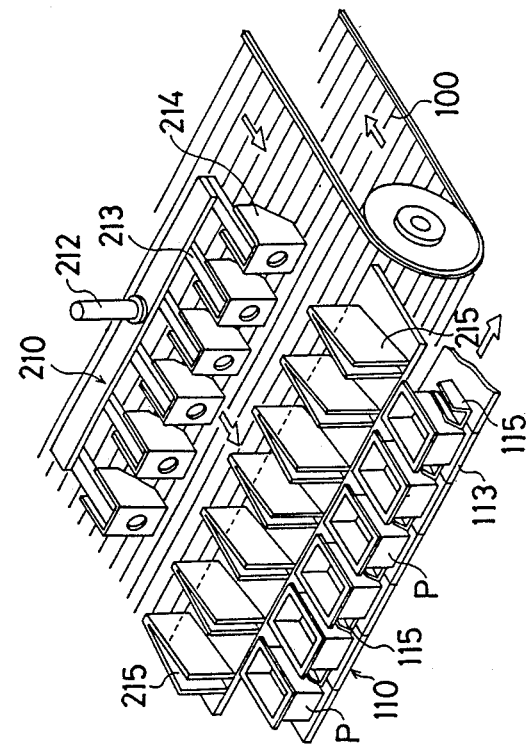
FIG. 5 is a perspective view of a part of the pushing mechanism of the apparatus.
Figure 4:
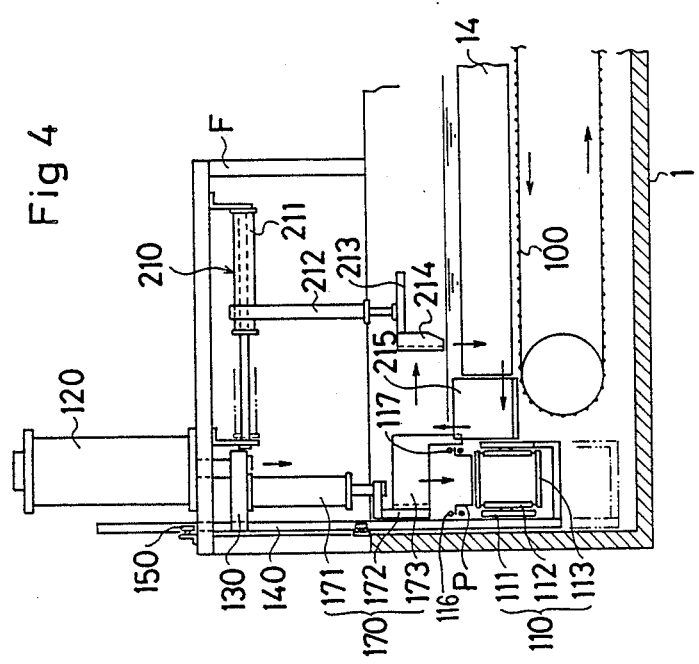
FIG. 4 is a side view of a part of the packing apparatus shown in FIG. 3.

A description is made below of the apparatus for cutting bean curd into pieces of desired size and then packing them according to the present invention, on the basis of an embodiment shown in the drawings.

Numeral 1 designates a water tank which is always filled with water or hot water of the temperature at which germs cannot live a preset level. Bean curd supplied in this water tank is pushed out, cut, carried in a row and packed below the surface of the water. A lift 2 on which a box B for coagulating soy bean milk is loaded is provided in the water tank. The lift 2 is provided with an up and down sylinder 21 on a frame F at the upper part of the water tank 1. The cylinder 21 is provided with an up and down rod 22, by which the lift 2 is supported tiltably through the medium of an axis 23. By the operation of a tilting lever 24 provided at the rod 22, the lift 2 is tilted frontward and rearward. Soybean milk is coagulated in the box B into a large block of bean curd and the box B is placed on the lift 2. At this time, the lift is tilted rearward so that bean curd does not project from the box even if a front plate B1 is removed (FIG. 7). The box B is of such shape as shown in FIG. 7. By the operation of the up and down cylinder 21, the lift 2 is lowered below the surface of the water and accordingly the box B containing bean curd also sinks below the surface of the water. The lift is tilted frontward and then a thin pushing out plate (not shown in the drawing) is inserted between the innermost of the box B and bean curd and this thin pushing out plate is moved toward a sending out table so as to push bean curd out of the box in the water. The sending out table is provided at the side of the lift 2 when lift 2 is in a descended state. This table 3 is movable horizontally at a right angle to the direction in which bean curd is pushed out of the bx B. The table 3 has a perpendicular side plate 31 only at one side (namely, L-shape in section), is supported movably by guide rails 32 and is adapted to be on the same level with a bottom plate of the box B when in its descended state. This table is moved by pushing or pulling a handle 33 provided protrudingly thereon. The moving distance of the table should correspond at least to the width of the box B. In order to ensure that a large block of bean curd pushed out of the box B is placed accurately on the sending out table 3, a guide stopper 34 is fixed in the water tank 1, opposite to the lift 2 with the sending out table 3 interposed therebetween.

A pushing out means 4 is arranged at the side of a horizontally moving position of the table 3. This pushing out means 4 comprises a pushing out cylinder 41 fixed to the frame 4, a guide rod 42 which is in parallel with the cylinder 41, a moving frame 43 which moves along the guide rod 42 and a pushing out plate 44 which is below the moving frame 43. The moving frame 43 carries a cylinder 51 of a fixed quantity pushing out means 5. A fixed quantity pushing out plate 52 is provided at the top end of a rod of the cylinder 51. This fixed quantity pushing out plate 52 and the pushing out plate 44 are so arranged that these plates are on a straight line while they are in a retreat position. These plates 44, 52 are moved simultaneously by the operation of the cylinder 41 through the medium of the moving frame 43 and push out bean curd on the sending out table 3 toward a plurality of blades 6 provided at a regular pitch and opposite to the pushing out means 4, whereupon a large block of bean curd is cut into plural pieces of cylinder shape, which are placed on a receiving table 11.

The pushing out means 4 stops for a while at an advanced position, whereupon bean curds of cylindrical shape which have been controlled in posture by the pushing out plate 44 and a guide stopper 13 opposite thereto are pushed out, piece by piece, to the position waiting for cutting in the fixed size. This means that while the pushing out means 4 stops at an advanced position, by the operation of the cylinder 51 of the fixed quantity pushing out menas 5 the pushing out plate 52 is advanced and pushes a cylindrical piece of bean curd out of the receiving table 11. In order to have the pushing out plate 52 advance accurately, a guide frame 53 is provided protrudingly at the frame to which the cylinder 51 is fixed and a guide rod 54 provided protrudingly at a pushing out frame 55 provided at the pushing out plate 52 is supported slidably by the frame.

When one cylindrical piece of bean curd on the receiving table 11 is pushed out, the pushing out plate 52 retreats near the blade 6 (namely, retreats to the position where the pushing out plate 44 is standing still), whereupon a horizontally pushing out plate 71 of a horizontally pushing out means 7 provided at a right angle to the pushing out plates 52, 44 and opposite to a guide stopper 12 is advanced by one pitch, namely, a length corresponding to the width of one cylindrical piece of bean curd, by the operation of a cylinder 72. By this operation, both end portions of cylindrical pieces of bean curd arranged in a row are controlled by the guide stopper 13 and the pushing out plate 44 which is standing still at an advanced position are pushed out to the position of the fixed quantity pushing out means by the horizontally pushing out plate 71. Then, the fixed quantity pushing out means is driven. Thus, bean curd is pushed out piece by piece and when bean curd is no longer present on the receiving table 11, the horizontally pushing out means 7 and the pushing out means 4 are retreated, together with the fixed quantity pushing out means 5. The sending out table 3 is also returned to its original position and the lift 2 is raised to place the next box thereon. It is possible to transfer bean curd from the box onto the sending out table, raise the lift and then take out an empty box.

Bean curd sent out piece by piece by the fixed quantity pushing out means 5 is guided by an up and down guide 8 which is above the receiving table 11 and opposes blades C1, C2, C3 ..... Cn for cutting in the fixed size which are arranged in a row at the regular pitch. At this time, a pushing out and cutting means 9 is standing ready at the outside of the up and down guide 8 and when the guide 8 descends, a transferring plate 91 for pushing out and cutting advances and pushes bean curd of cylindrical form in flank against the blades C1, C2, C3 ..... Cn to cut bean curd into pieces of the predetermined fixed size. Each bean curd of the fixed size moves between lining up guide plates 14. When each bean curd of the fixed size moves to a terminal of the plate 14, the transferring plate 91 returns to its original position and the up and down guide 8 rises to wait for supply of the next bean curd.

The up and down guide 8 is composed of a guide 81 of shape and of a size to hold one cylindrical piece of bean curd and an up and down cylinder 82 which moves the guide 81.

Bean curd cut in the fixed size is then transferred to a packing process, where it is packed automatically. An explanation is made below of the packing apparatus.

In the water tank 1, blades C1, C2, C3 .... Cn and lining up guide plates 14 are arranged connectively. A receiving plate 15 is provided below blades C1, C2, C3 .... Cn so that cut pieces of bean curd are supported by lining up guide plates and transported with a space suitable for packing therebetween. Provided below the terminals of lining up guide plates 14 is a transporting means 100 in place of the receiving plate 15, whereby bean curd is transferred to a packing process. The lining up guide plates are arranged with the required space therebetween so that bean curd pieces of the fixed size can be sent separately from each other. A conveyor 110 for packing is arranged movably up and down at the terminal portions of the lining up guide plates. This conveyor 110 for packing is supported by the frane F on the water tank 1. An up and down frame 130 is suspended from a cylinder 120 which is on the frame. A guide rod 140 is provided protrudingly for the up and down frame 130 so that the frame can be raised and lowered accurately at the determined position. This guide rod 140 is held by guide rollers 150 provided at the frame so that the up and down frame 130 is allowed to move only in vertical direction. A frame 111 of the conveyor 110 for packing is fixed below the up and down frame 130 or below the guide rod 140. This conveyor frame 111 which dips or sinks in an arch shape at its central part supports rotatably sprocket wheels (or drums) at its both ends. A conveyor 113 is stretched between these two sprocket wheels. This conveyor 113 sinks at its central part and rises at its both end portions, in accordance with the shape of the conveyor frame 111, so that wheel parts are located above the surface of the water at all times. One of the wheels is driven by a driving device 114 provided at the conveyor frame or the up and down frame so that the conveyor is revolved intermittently. Packs P are placed on the conveyor 113 at regular intervals and also pack holders 115 are provided throughout the total length of the conveyor 113 with the space corresponding to the width of a pack P. Provided above both sides of the conveyor frame 111 is a pack floating preventive mechanism having two guide rails 116, 117. A flange part Pa of the pack P is held between these guide rails 116, 117 so that the pack may not float on the water when the conveyor frame descends below the surface of the water.

Provided above one end portion of the conveyor 110 for packing is a pack supplying machine 160. By synchronizing the driving speed of the conveyor 113 with the pack supplying speed, packs P are supplied on continuous basis between pack holders 115 of the conveyor 113 in a row. A guide device 170 is provided movably up and down above the central part of the conveyor 110 for packing. This guide device 170 comprises a cylinder 171 provided at the up and down frame 130, a guide frame 172 suspended from the cylinder 171 and many guides 173 arranged at the pitch corresponding to the pitch at which packs are disposed on the conveyor. This guide 173 is of ⌐ shape in plane and is arranged in such a fashion that it opens to the side of lining up guide plate 14.

Numeral 210 designates a bean curd supplying means which comprises an up and down cylinder 212 which drives in the direction perpendicular to a supplying cylinder 211 which drives in the direction of supplying bean curd to packs, a frame 213 which is provided horizontally at the lower end of a rod of the up and down cylinder 212 and in parallel with the conveyor, and many sending out plates 214.

The method of packing by using the above apparatus is explained below.

When the rear end portion of bean curd T in the forefront row which is being transported between lining up guide plates from the transporting plate 91 to the transporting means 100 passes through the sending out plate 214 of the bean curd supplying means 210 or is stopped at the fixed position, the sending out plate 214 is lowered by means of the up and down cylinder 212 and squeezes itself between two lining up guide plates 14. Then, by making the sending out plates 214 advance, together with the up and down cylinder 212, by means of the supplying cylinder 211, bean curd T is sent out to the side of the conveyor 110 for packing, passing through between guide plates 215 which are arranged in a row between the lining up guide plate 14 and the conveyor 110. At this time, the conveyor 110 for packing is lowered by means of the cylinder 120, and stops at the position where packs P on the conveyor sink under the water and each pack opposes between lining up guide plates. At the same time, the guide 173 lowers to such an extent that it almost touches the upper part of the pack. Therefore, bean curd T send out by the sending out plate 214 is guided by the guide of ⌐ shape which opens at the front and is fed into a pack. At this time, there is a fear that some bean curds do not enter in a pack but float on the water. In order to eliminate such trouble, after the guide 173 was raised by driving of the cylinder 171, the conveyor 110 itself is raised to such an extent that the upper part of the pack is on the same level with the surface of the water or a little above the surface of the water so that the water in the pack flows out due to the empty weight of bean curd and bean curd is inserted into a pack. Then, after solid packs were taken out and empty packs were carried to the bean curd packing position by driving the conveyor 113, the conveyor 113 is stopped. When the conveyor 113 is driven, the conveyor frame is standing still at the raised position and the pack supplying machine is driven, whereby empty packs are placed on the conveyor 113. When empty packs are supplied onto the conveyor and reach the bean curd packing position, the conveyor is stopped and the conveyor frame is lowered by means of the cylinder 120, whereupon packs sink under water. At this time, the upper surface of the pack should be a little below the undersurface of bean curd T send out by the transferring means and the sending out plates so that bean curd enters into a pack spontaneously. Then, the guide 173 is lowered so that it touches the upper part of a pack, ready for the next supply of bean curd.

The foregoing operations are repeated in turn so as to pack bean curd in the water on automatic and continuous basis.

According to the present invention, bean curd coagulated in a box is placed on a lift, is pushed out of the box and is cut mechanically into pieces of the fixed size in the water. Therefore, as compared with conventional manual operations, the present invention improves production efficiency, is sanitary and makes it possible to pack bean curd automatically.

What is claimed is:

1. A bean curd automatic cutting apparatus comprising:
   a tiltable coagulating box for holding soybean milk for coagulating into a large block of coagulated soy bean curd, and means on said coagulating box for releasing a large block of coagulated soy bean curd when said tiltable box is tilted;
   a lifting and tilting means attached to said coagulating box for raising and lowering said box and for tilting said box for causing a large block of soy bean curd to be released by said releasing means on said box from said box onto a sending out table;
   a sending out table disposed adjacent to said coagulating box for receiving a large block of bean curd from said box thereon;
   a first plurality of cutting blades disposed adjacent to said sending out table for cutting a large block of soy bean curd into a plurality of elongated blocks of bean curd;
   a pushing out means disposed adjacent to said sending out table for pushing a large block of soy bean curd received on said sending out table in a first direction against said first plurality of cutting blades for cutting a large block of bean curd into a plurality of elongated blocks, said pushing out means including a first and a second reciprocably movable pushing out plate, and said pushing out means having an actuating means for simultaneously actuating said first and second pushing out plates for jointly pushing a large block of bean curd in the first direction against said first plurality of cutting blades, said second pushing out plate being a fixed quantity pushing out means for further pushing one of a plurality of elongated soy bean curd blocks cut by said first plurality of cutting blades, said actuating means causing said second pushing out plate to move still further in the first direction after said first plurality of cutting blades has cut a large block of soy bean curd into a plurality of elongated blocks for further pushing one of said plurality of elongated blocks into a pushing out and cutting means;
   a pushing out and cutting means disposed adjacent to said first plurality of cutting blades for receiving one elongated block of soy bean curd from said fixed quantity pushing out means, an up and down guide on said pushing out and cutting means for receiving and substantially physically supporting the one elongated block of soy bean curd received from said fixed quantity pushing out means, a second plurality of cutting blades on said pushing out and cutting means for cutting an elongated block of soy bean curd into a plurality of predetermined size blocks, a plurality of guides on said pushing out and cutting means for guiding and supporting said plurality of predetermined size blocks cut by said second plurality of cutting blades;
   a horizontally pushing out means disposed adjacent to said fixed quantity pushing out means and said pushing out and cutting means for advancing the plurality of elongated blocks of bean curd cut by said first plurality of cutting blades sequentially in a second direction substantially perpendicular to the first direction causing one of the plurality of elongated blocks at a time to be adjacent to said second pushing out plate of said fixed quantity pushing out means for being further pushed in the first direction thereby; and
   a water tank means for holding water for continuously covering each one of a large soy bean curd block, a plurality of elongated soy bean curd blocks, and a plurality of predetermined size soy bean curd blocks when received in and on said coagulating box, said sending out table, said pushing out means, said pushing out and cutting means, and said horizontally pushing out means, respectively.

* * * * *